US008342187B2

(12) United States Patent
Kalman et al.

(10) Patent No.: US 8,342,187 B2
(45) Date of Patent: Jan. 1, 2013

(54) VIBRATING DEVICE

(75) Inventors: Jeffrey Michael Kalman, Cleveland Heights, OH (US); Carolyn Marie McNeeley, Fairview Park, OH (US); John Richard Nottingham, Bratenahl, OH (US); Rachel Nottingham Colosimo, Cleveland Heights, OH (US); John Wilford Spirk, Gates Mills, OH (US); Jeffrey Silver Taggart, Cleveland Heights, OH (US); Jay Philip Tapper, Wayne, PA (US)

(73) Assignee: Conopco, Inc., Englewood Cliffs, NJ (US)

( * ) Notice: Subject to any disclaimer, the term of this patent is extended or adjusted under 35 U.S.C. 154(b) by 79 days.

(21) Appl. No.: 12/919,086

(22) PCT Filed: Feb. 17, 2009

(86) PCT No.: PCT/EP2009/051844

§ 371 (c)(1),
(2), (4) Date: Sep. 27, 2010

(87) PCT Pub. No.: WO2009/109461

PCT Pub. Date: Sep. 11, 2009

(65) Prior Publication Data

US 2011/0041864 A1 Feb. 24, 2011

(30) Foreign Application Priority Data

Mar. 6, 2008 (EP) .................................... 08152365

(51) Int. Cl.
*A45D 24/00* (2006.01)
*A01K 13/00* (2006.01)
*A61H 23/00* (2006.01)
*A61H 1/00* (2006.01)

(52) U.S. Cl. ..................... 132/119.1; 119/609; 601/109; 601/73

(58) Field of Classification Search ............... 132/119.1; 119/608, 609; 601/82, 109, 67, 70, 72, 73
See application file for complete search history.

(56) References Cited

U.S. PATENT DOCUMENTS

| | | | | |
|---|---|---|---|---|
| 1,818,281 | A | 8/1931 | Sass | |
| 2,465,250 | A | 3/1949 | McCready | 128/46 |
| 2,806,235 | A | 9/1957 | Carstairs et al. | 15/22 |
| 3,150,393 | A | 9/1964 | Taylor et al. | 15/23 |
| 3,204,469 | A | 9/1965 | Spillers | 74/22 |
| 3,272,023 | A | 9/1966 | Ferguson et al. | 74/55 |
| 3,358,309 | A | 12/1967 | Richardson | 15/22 |
| 3,384,096 | A | 5/1968 | Paccione | 132/11 |
| 3,517,235 | A | 6/1970 | Flowers et al. | 310/80 |
| 3,794,050 | A | 2/1974 | Gallanis et al. | 132/11 |
| 3,850,181 | A | 11/1974 | Baker | 132/11 |

(Continued)

OTHER PUBLICATIONS

PCT International Search Report in PCT application PCT/EP2009/051844.

(Continued)

*Primary Examiner* — Nicholas Lucchesi
*Assistant Examiner* — Niyati D Shah
(74) *Attorney, Agent, or Firm* — Ronald A. Koatz

(57) ABSTRACT

Vibrating grooming device comprising a vibrating head (1) with bristles and/or tines (3) and a handle (2), the vibrating head comprising a motor (10) and an oscillating mass (11), the device characterized by the oscillating mass being disposed to oscillate linearly along an oscillating axis.

4 Claims, 3 Drawing Sheets

U.S. PATENT DOCUMENTS

Figure 1:
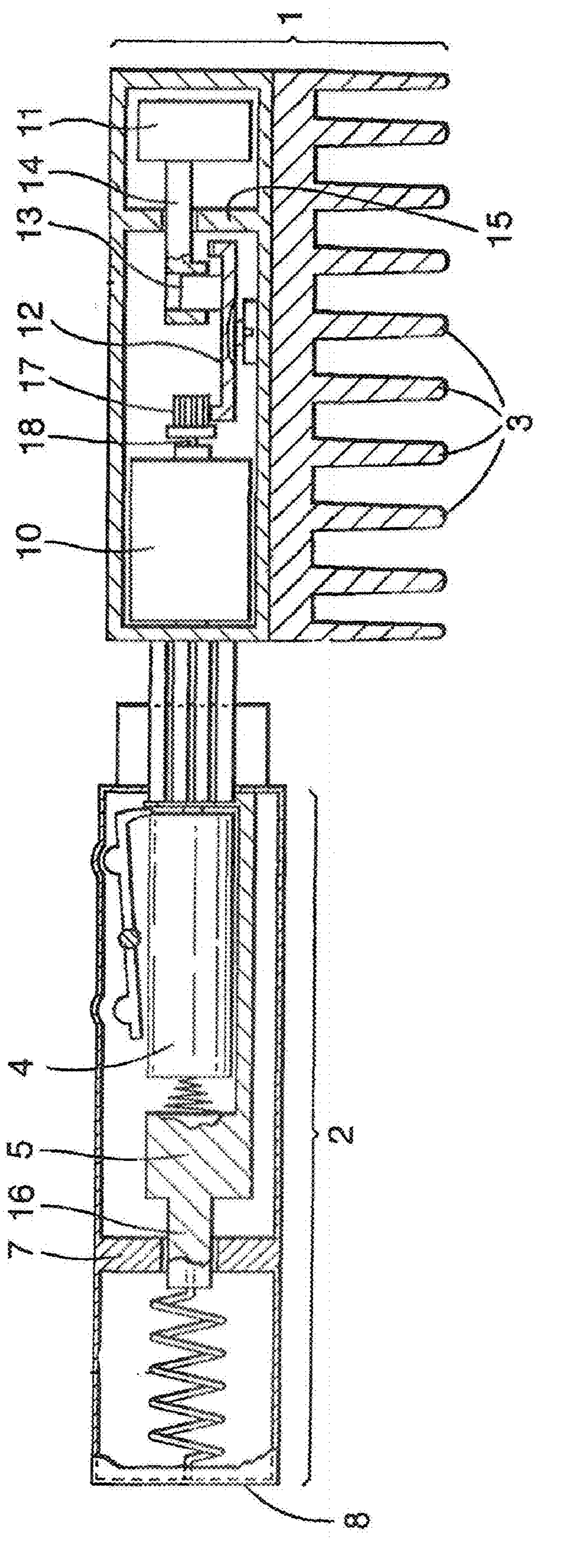

| | | | | |
|---|---|---|---|---|
| 3,853,133 | A | 12/1974 | Komatsu et al. | 132/11 |
| 3,897,794 | A | 8/1975 | Branch | 132/11 |
| 4,139,014 | A | 2/1979 | Rowland | 132/11 |
| 4,158,246 | A | 6/1979 | Meadows et al. | 15/28 |
| 4,585,018 | A | 4/1986 | O'Connor | 132/120 |
| 4,651,761 | A | 3/1987 | Suen et al. | 132/148 |
| 5,078,157 | A | 1/1992 | Golan et al. | 132/119 |
| 5,297,512 | A | 3/1994 | Sharp | 119/86 |
| 5,343,881 | A | 9/1994 | Golan et al. | 132/119.1 |
| 5,471,695 | A | 12/1995 | Aiyar | 15/22.1 |
| 5,502,860 | A | 4/1996 | Franke | 15/160 |
| 5,511,270 | A * | 4/1996 | Eliachar et al. | 15/22.1 |
| 5,603,339 | A | 2/1997 | Brazeal et al. | 132/119.1 |
| 5,622,192 | A * | 4/1997 | Chiou | 132/112 |
| 5,632,289 | A | 5/1997 | Sharp | 132/116 |
| 5,647,841 | A | 7/1997 | Groenewold et al. | 601/114 |
| 5,839,451 | A | 11/1998 | Dorber et al. | 132/271 |
| 5,915,391 | A | 6/1999 | Revil | 132/119.1 |
| 5,918,607 | A | 7/1999 | Zucker | 132/200 |
| 5,967,150 | A | 10/1999 | Wright et al. | 132/119.1 |
| 5,987,681 | A | 11/1999 | Hahn et al. | 15/22.1 |
| 6,283,930 | B1 * | 9/2001 | Purvis et al. | 601/137 |
| 6,575,173 | B2 | 6/2003 | Quan et al. | 132/119.1 |
| 6,668,758 | B1 | 12/2003 | Davis, Jr. | 119/608 |
| 6,997,889 | B1 | 2/2006 | Thomas | 601/137 |
| 7,356,866 | B2 * | 4/2008 | Chan | 15/22.1 |
| 7,805,794 | B2 | 10/2010 | Taggart et al. | 15/22.2 |
| 7,814,601 | B2 | 10/2010 | Taggart et al. | 15/21.1 |
| 7,865,994 | B2 | 1/2011 | Taggart et al. | 15/221 |
| 2003/0065280 | A1 * | 4/2003 | Park | 601/73 |
| 2003/0084525 | A1 | 5/2003 | Blaustein et al. | 15/22.1 |
| 2004/0035439 | A1 * | 2/2004 | Lai et al. | 132/322 |
| 2007/0068546 | A1 * | 3/2007 | Lipawsky | 132/119.1 |
| 2008/0210252 | A1 | 9/2008 | Taggart et al. | 132/119.1 |
| 2009/0083918 | A1 | 4/2009 | Taggart et al. | 15/22.1 |

OTHER PUBLICATIONS

GB Search Report in GB application GB 0402199.4.
JP Abstract JP 03 222 905—published Oct. 1, 1991.
JP Abstract JP 2004 065914—published Mar. 4, 2004.
JP Abstract JP 2007 037978—published Feb. 15, 2007.
Derwent Abstract of WO 88/06852—published Sep. 22, 1988.
Derwent Abstract of WO 96/17534—published Jun. 13, 1996.
Derwent Abstract of DE 44 43 833—published May 23, 1996.
Derwent Abstract of FR 2 757 030 — published Jun. 19, 1998.
Abstract of NL 1020135—published Sep. 10, 2003.
Co-pending application: Applicant: Taggart et al., U.S. Appl. No. 12/074,007, filed Feb. 29, 2008.

* cited by examiner

VIBRATING DEVICE

The present invention relates to a vibrating grooming device.

Despite the prior art there remains a need for improved grooming implements which detangle the hair.

Accordingly, the present invention provides a vibrating grooming device comprising a vibrating head with bristles and/or tines and a handle, the vibrating head comprising a motor and an oscillating body, the device characterized by the oscillating body being disposed to oscillate linearly.

The oscillating body oscillates along an oscillating axis. Preferably, the oscillating axis is perpendicular to a bristle or tine extending direction. Preferably, the oscillating axis is parallel to the axis of the handle. The bristle or tine extending direction is the direction which the bristles and/or tines extend from their base to their respective tips.

The grooming device is a comb, brush or other such grooming device. It comprises bristles and/or tines. The bristles and/or tines extend from a bristle/tine extending surface on the device head. This surface may be flat or curved. The device head may also comprise a bristle/tine extending surface which is cylindrical and has bristles and or tines extending radially therefrom.

Preferably, the oscillating axis is substantially coaxial or substantially aligned with a motor drive shaft axis. The motor drive shaft axis is the axis about which the drive shaft of the motor rotates during use. Preferably, the motor drive shaft axis is substantially perpendicular to a general bristle/tine extending direction.

The oscillating body is disposed to oscillate substantially coaxially with or substantially parallel to the motor drive shaft axis. This means that the oscillating body oscillates linearly towards and away from the motor during use and so vibrates the brush head in such a way that the bristles/tine ends are vibrated substantially linearly as opposed to elliptically or in a circle.

Preferably, the handle comprises a core and a sheath, the sheath being connected to the core by a vibration damping means. Typical vibration damping means include bellows, springs, resilient bushing and combinations thereof.

The core of the handle oscillates linearly within the sheath of the handle. Since it is the sheath of the handle which is held during use this prevents the user from experiencing excessive vibration during use.

Preferably, the core houses a power supply. Power supplies include batteries which are preferably rechargeable.

Preferably, the head comprises a carrier which is connected to the oscillating mass at one end and a crown gear mounted pin at the other, the crown gear mounted to the motor drive shaft. The crown gear may be connected to the drive shaft by a spur gear.

Preferably, the carrier comprises a shaft between its ends which passes through a fixed bushing. The fixed bushing may comprise an aperture or groove dimensioned to allow the shaft of the carrier to pass through thus restricting non-linear movement of the carrier, and thus providing the linear reciprocating movement of the oscillating body.

Preferably, the device comprises means for stabilizing the vibrating head with respect to the handle in order to prevent the grooming head from rotating about its longitudinal axis. Typical means include a cooperating lug and groove arrangement between the vibrating head and the non-vibrating part of the handle.

Preferably, the device comprises means for stabilizing the grooming head with respect to the handle in order to prevent the grooming head from translating in any direction other than along the oscillating axis. Typical means include a cooperating lug and groove arrangement between the vibrating head and the non-vibrating part of the handle.

Embodiments of the invention will now be described with reference to the following non-limiting drawings in which FIG. 1 shows a vibrating comb with a combing head 1 and a handle 2. The combing head 1 comprises an array of tines 3 for combing the hair.

The handle 2 consists of two parts: an inner part and an outer part. The outer part is the part which is held during use and is isolated from the inner part which is fixedly attached to the vibrating part of the head so that the handle is not excessively vibrated during use.

The inner part comprises a battery 4 maintained in a housing 5 which is stabilized within the handle at one end by a pin 16 which is held within an aperture of a stabilizing bushing 7. The housing is further stabilized by a spring 8 which is fixed to the inner far end of the handle's outer part to dampen the vibrations between the vibrating part and the handle 2.

The head 1 of the device comprises a motor 10 which during use rotates a drive shaft 18. The drive shaft 18 is attached to a spur gear 17. The spur gear 17 is in contact with a crown gear 12 seen side on. The crown gear is thus rotated in its own plane when the drive shaft and spur gear are rotated about their axes. The crown gear 12 has a pin 13 which is rotated as the crown gear is rotated. The top of the pin is disposed within a slot in a carrier 14 and as the pin 13 is rotated it drags the carrier 14 towards and then away from the motor. The shaft of the carrier 14 is disposed within an aperture in a stabilizing bushing 15 which maintains the lateral position of the carrier and so allows solely for reciprocal movement by the body 11 at the end of the carrier 14. Accordingly, as the motor 10 is activated the drive shaft 18 rotates about its axis and the crown gear 12 is also rotated about its axis. The carrier 14 and so the body 11 is thus pulled towards and pushed away from the motor 10 in a linear fashion.

Figure 2:
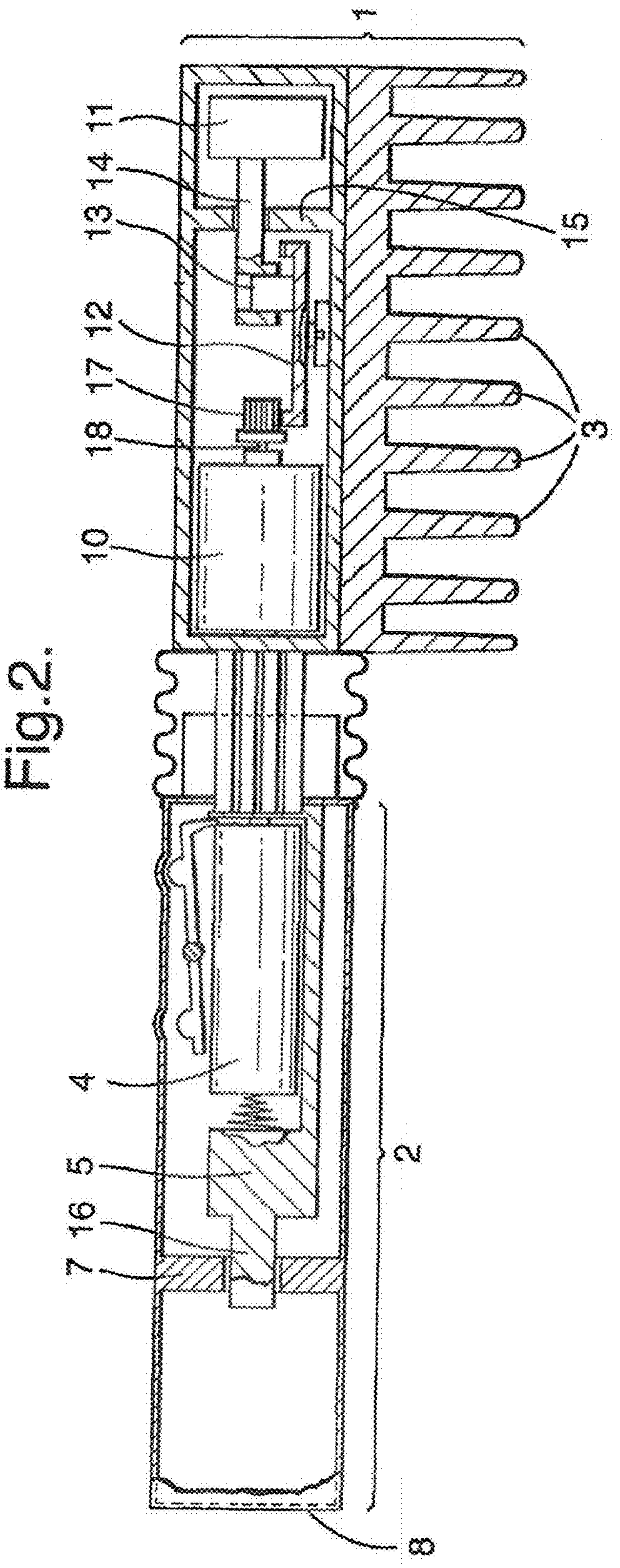

FIG. 2 shows an alternative embodiment which is similar to that shown in FIG. 1 but instead of a spring which damps the vibrations in this embodiment there is a resilient bellows fixing the vibrating part to the non-vibrating part of the handle.

As shown in FIG. 1, FIG. 2 shows a cooperating male and female spline arrangement between the vibrating part of the head and the vibrating part of the inner handle 5.

Figure 3:
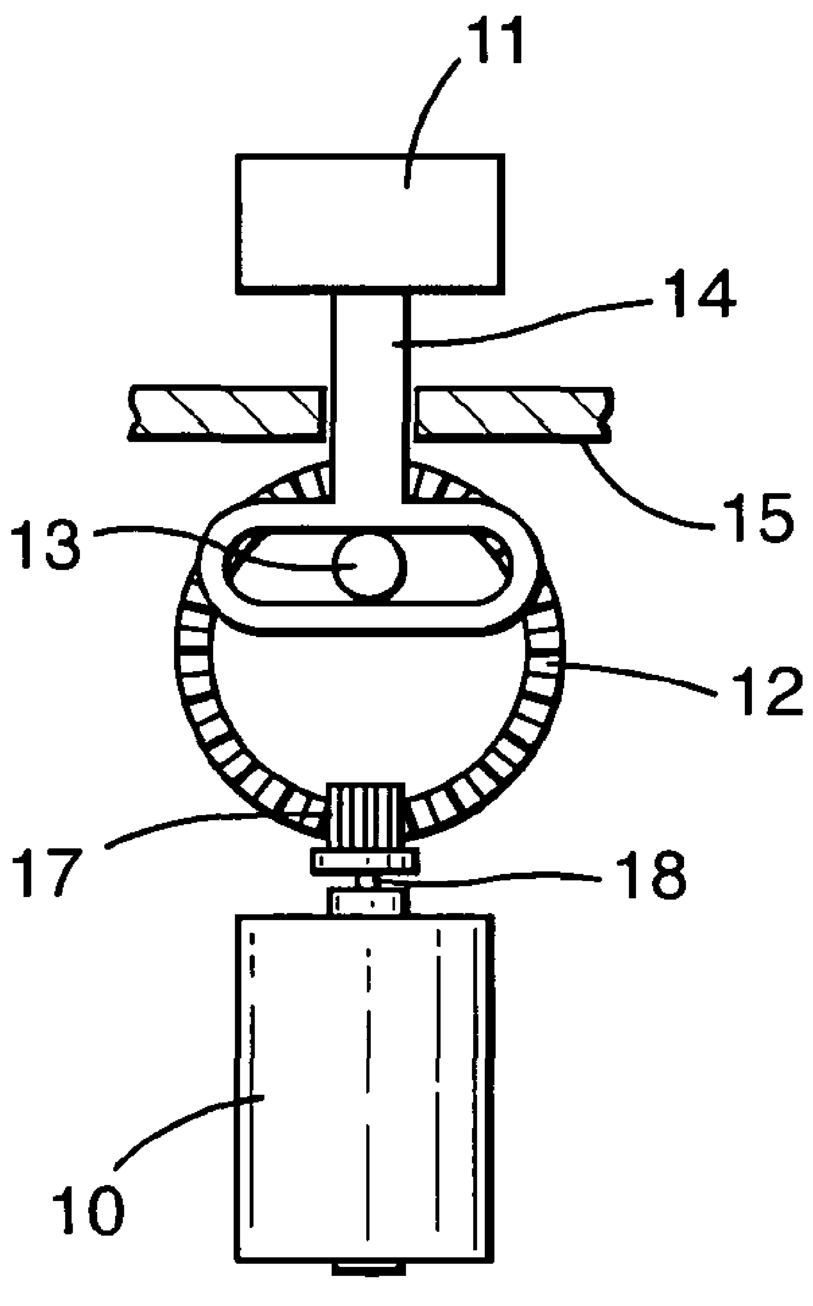

FIG. 3 shows the cam arrangement shown in FIGS. 1 and 2 but in plan view. The motor 10 rotates a drive shaft 18 which is fixed to a spur gear 17. The spur gear 17 engages with a crown gear 12. As the crown gear 12 rotates, the pin 13 is also rotated about the same axis and pulls the carrier 14 towards and then away from the motor 10 as the crown gear 12 rotates. The carrier 14 is maintained laterally by an aperture in the stabilizing bushing 15 and so the body 11 is moved linearly towards and away from the motor thus effecting vibration of the head of the device.

The invention claimed is:

1. Vibrating grooming device comprising (1) a vibrating head with bristles and/or tines and (2) a handle, wherein said vibrating head comprises (a) a motor, (b) an oscillating body; and (c) a carrier which is connected to the oscillating body at one end and to a crown gear mounted off-center pin at a second end, the crown gear engaging a motor drive shaft and wherein a vibrating movement frequency is from 20-200 Hz; and wherein said handle comprises a power supply in a housing, which housing is stabilized by a pin held within an aperture of a stabilizing bushing and which housing is further stabilized by a spring fixed to an inner far end of the handle's outer part; the device characterized by the oscillating body in the head being disposed to oscillate linearly along an oscillating axis which is perpendicular to a bristle or tine extending direction, with the carrier in the head pulling and pushing the oscillating body away from the motor in the head in said linear fashion.

2. Device according to claim 1 wherein the handle comprises a core comprising said housing and said power supply and a sheath, the sheath being connected to the core by a vibration damping means.

3. Device according to claim 1 wherein the carrier comprises a shaft between its said ends which passes through a fixed bushing.

4. Device according to claim 1 wherein the vibrating movement frequency is from 30 to 50 Hz.

* * * * *